Figure 7:
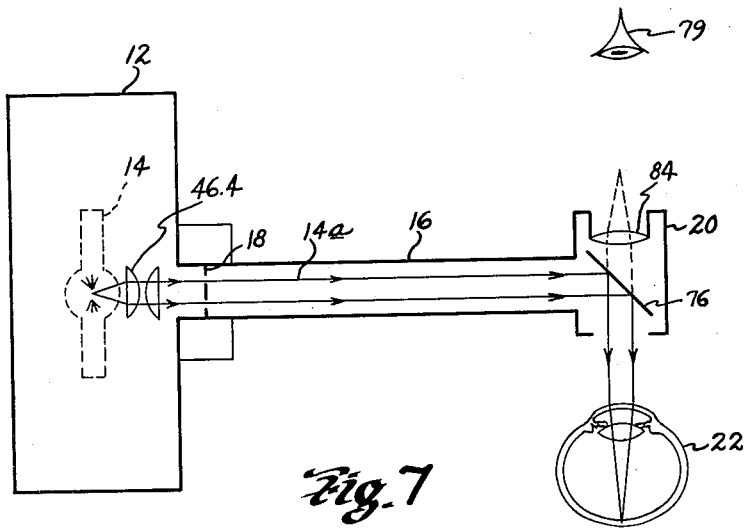

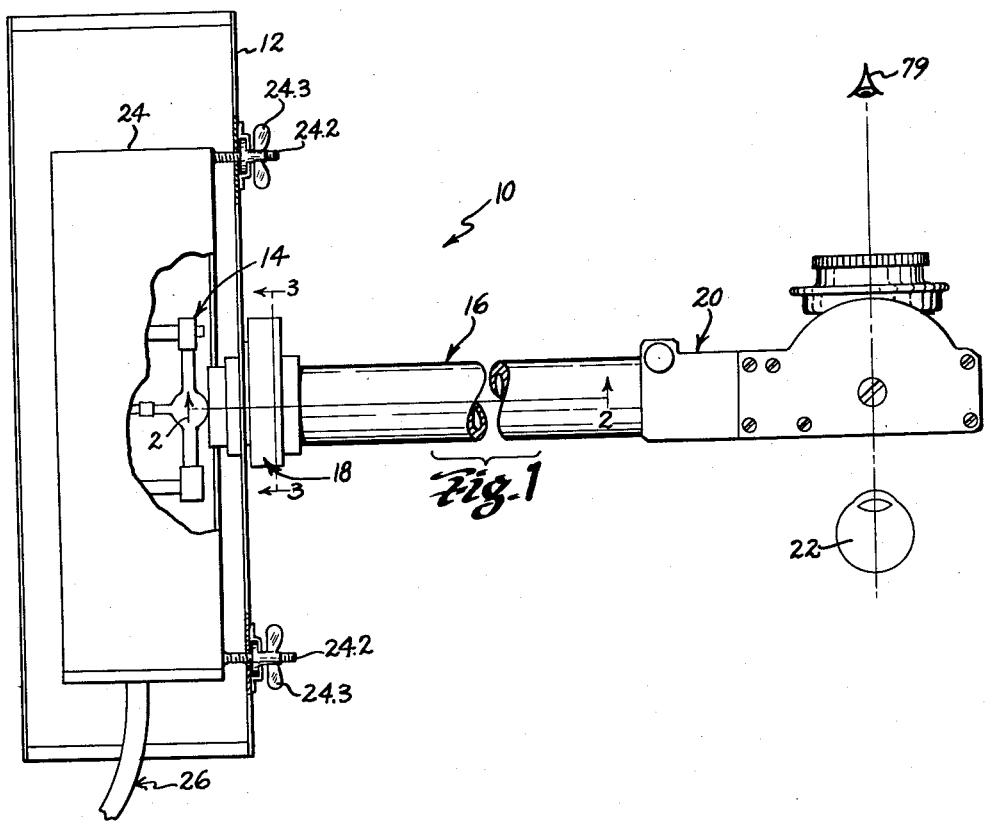
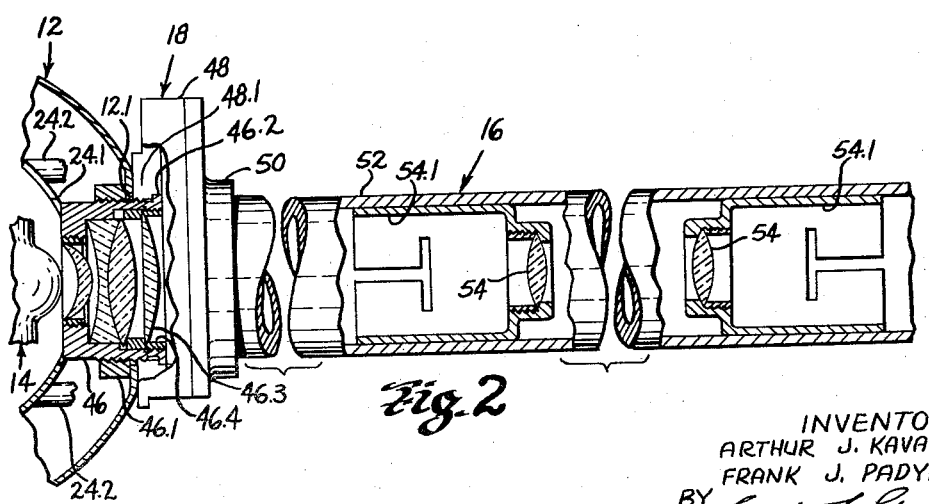

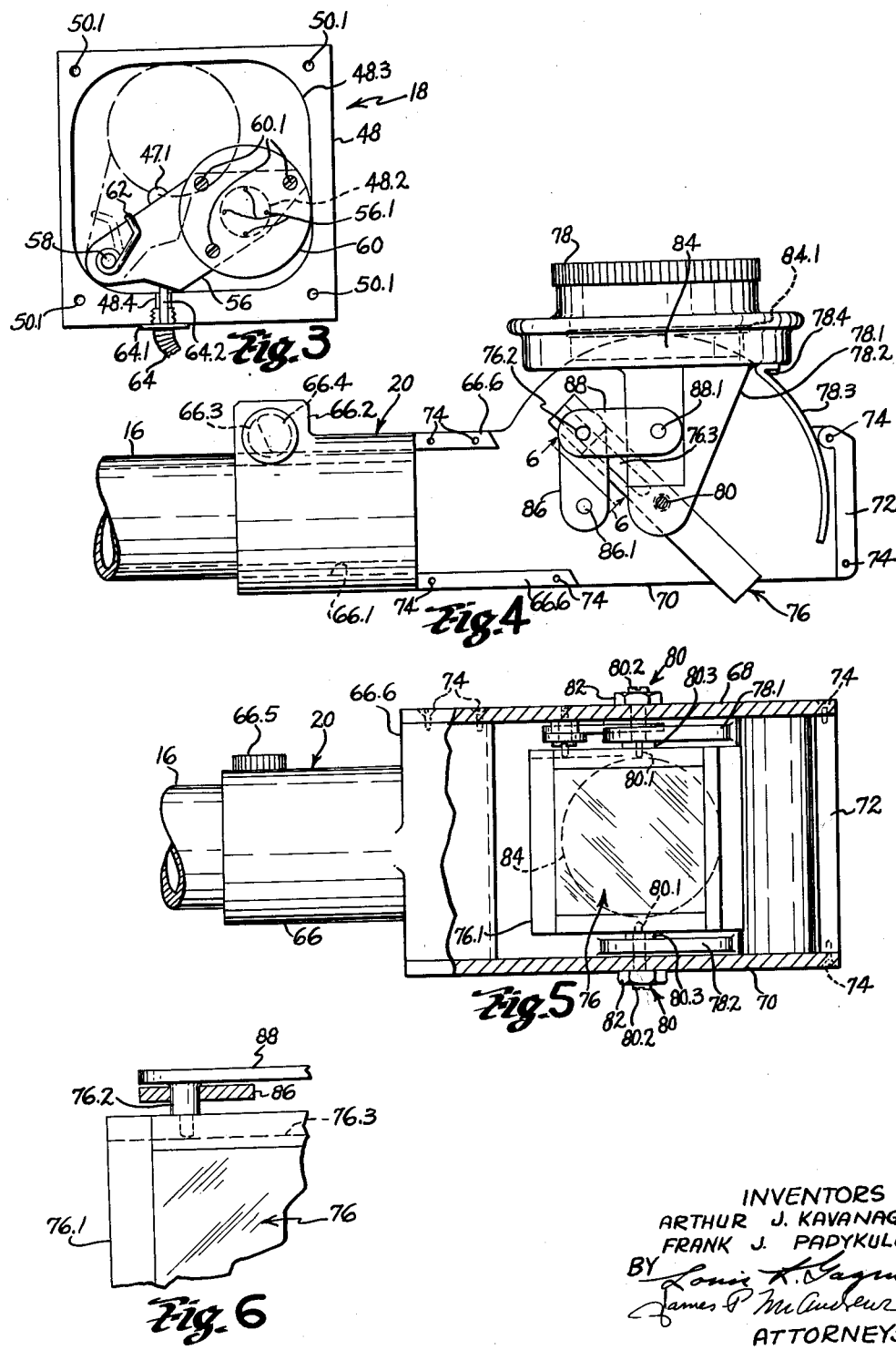

April 9, 1963 A. J. KAVANAGH ETAL 3,084,694
PHOTO-COAGULATION APPARATUS

Filed March 29, 1960 3 Sheets-Sheet 3

INVENTORS
ARTHUR J. KAVANAGH
FRANK J. PADYKULA
BY
ATTORNEYS

United States Patent Office  3,084,694
Patented Apr. 9, 1963

3,084,694
PHOTO-COAGULATION APPARATUS
Arthur J. Kavanagh, Southbridge, and Frank J. Padykula, Chicopee, Mass., assignors to American Optical Company, Southbridge, Mass., an association of Massachusetts
Filed Mar. 29, 1960, Ser. No. 18,355
1 Claim. (Cl. 128—396)

The field of this invention is that of photo-coagulation of the human eye and the invention relates more particularly to novel and improved apparatus for effecting such photo-coagulation.

The process of inducing chorioretinal burns by the concentration of radiant energy upon the fundus of an eye, the process called photo-coagulation, has been developed principally to achieve fusion or attachment of the retina and the choroid to reduce, limit or avoid detachment of the retina such as might be caused by periphlebitis, fundus tumors, retinal lesions, or retinal holes of an hereditary nature. The process comprises the application of radiant energy to the cornea during maximum mydriasis or pupillary dilation in such a manner that the energy is concentrated at the desired point upon the fundus by the refractive media of the eye, thereby to fuse the retina to the choroid within a narrowly localized area. Since the refractive media of the eye may be injured or impaired by ultraviolet radiation and since radiant energy directed upon the fundus may be rapidly dissipated or conducted into surrounding portions of the eye, particularly by the blood vessels in the choroid and by the pigment epithelium, the radiant energy should be applied in the form of light within the visible spectrum at sufficiently high intensity for accomplishing the desired degree of chorioretinal coagulation within a very short period of time. To meet these requirements, conventional photo-coagulation apparatus has incorporated means for providing radiant energy in the desired form and intensity but has encountered excessive power loss which has made such apparatus expensive to manufacture and operate and which has required elaborate cooling means for dissipating heat generated as a result of such power losses.

In addition, since chorioretinal coagulation sufficient to result in permanent attachment of the retina requires destruction of the visual nerves in the coagulated area, the area of coagulation must be precisely positioned and narrowly circumscribed in the location most advantageously effecting such retinal attachment whether that location is within macular or peripheral retinal areas. In conventional photo-coagulation apparatus, observation of the fundus and accurate control of the concentration of radiant energy upon the proper fundus area prior to chorioretinal coagulation is inconvenient and difficult to accomplish particularly where coagulation is to be induced in peripheral retinal areas.

It is an object of this invention to provide compact photo-coagulation apparatus which is inexpensive to manufacture and operate and which can be easily stored, transported and manipulated during use.

It is a further object of this invention to provide photo-coagulation apparatus which is adapted to provide radiant energy in the desired form and manner without excessive power loss and without the excessive generation of heat which would accompany such power loss.

It is another object of this invention to provide photo-coagulation apparatus which can be readily adapted for permitting convenient observation of the fundus of an eye including peripheral areas thereof and which can be conveniently adjusted for properly concentrating radiant energy upon the fundus area selected for coagulation during such observation.

It is an additional object of this invention to provide photo-coagulation apparatus for directing light upon the fundus of an eye to induce chorioretinal coagulation, which apparatus can be adapted to direct a part of said light upon a substantial fundus area for illuminating the fundus to permit observation thereof prior to said coagulation, which can be adapted to direct a part of said light upon the fundus for verifying concentration of the light prior to said coagulation and which is adapted for automatically increasing the intensity of the light when the full amount of the light is directed onto the fundus for effecting coagulation.

Briefly described, the photo-coagulation apparatus provided by this invention comprises a light source, means focusing a beam of light emanating from the source upon the fundus of an eye for inducing chorioretinal coagulation, and means adapted to direct a relatively small part of the light upon a relatively large part of the fundus for observing the fundus prior to such coagulation.

In a preferred embodiment of this invention, the apparatus comprises a light source of the electric arc type such as a high-pressure mercury-vapor arc lamp, an optical system which may include lens means and reflecting means adapted to direct a beam of light emanating from the source upon an eye, and, preferably, means for adjusting the relative positions of the light source and optical system to direct the beam so that the eye, despite abnormalities in the refractive media of the eye, focuses the light upon the fundus of the eye for inducing chorioretinal coagulation. The apparatus also includes movable shutter means which are temporarily disposed in the path of the light beam to block all but a relatively small part of the light for permitting observation of the fundus prior to coagulation, the shutter means preferably having a plurality of apertures which pass said small part of the light in separate pencils for verifying focus of the light upon the fundus. Means, preferably movable with the shutter means, are provided for diffusing said small part of the light to enlarge the fundus area illuminated thereby, and, preferably, means actuated by movement of the shutter means from within the path of the light beam are adapted to increase intensity of the light source automatically, for example, by increasing power supply to the mercury-vapor arc lamp, to effect chorioretinal coagulation.

Other objects, advantages and details of construction will appear in the following more detailed description of a preferred embodiment of the invention wherein:

FIG. 1 is a front elevation view of the apparatus provided by this invention;
FIG. 2 is a partial section view along line 2—2 of FIG. 1;
FIG. 3 is a partial section view along line 3—3 of FIG. 1;
FIG. 4 is a partial front elevation view showing the reflecting means mounting with a mounting plate removed;
FIG. 5 is a partial bottom view;
FIG. 6 is a partial section view along line 6—6 of FIG. 4;
FIG. 7 is a diagrammatic view of the apparatus; and
FIG. 8 is a schematic view of the apparatus power supply.

Referring to the drawings, 10 in FIG. 1 indicates the photo-coagulation apparatus provided by this invention which includes a frame or casing 12 enclosing a light source 14. The casing has an optical system housing 16, incorporating a shutter mechanism 18, mounted thereon; and a reflector assembly 20, which is mounted upon one end of the housing 16, is also provided for directing a beam of light emanating from the source 14 upon the eye of a subject, as indicated at 22, to induce chorioretinal burns. As illustrated, the apparatus is adapted to be mounted upon any suitable stand (not shown) by suitable clamp means for supporting the apparatus in proper positional relation to the subject's eye, but it should be understood that stand means, adjustable or otherwise, could be incorporated in the apparatus within the scope of this invention and that other casing constructions could be utilized with equally advantageous results.

The light source 14 preferably comprises a lamp of the electric arc type which is disposed within a protective, light-shielding mount 24, suitably apertured as at 24.1, and which is adjustably supported within the frame 12 by mounting studs 24.2, the studs being threadedly engaged with nuts 24.3 rotatably mounted on the frame. The lamp is preferably of the high-pressure mercury-vapor arc type such as that sold under the trade name Osram HBO–107, shown here, which has a 50 volt, 5 ampere D.C. rating and which is capable of producing an arc light of 100,000 stilb intensity sufficient to induce chorioretinal burns. However, high-pressure, xenon-arc lamps or other types of high vapor pressure electric arc lamps can be utilized within the scope of this invention.

Figure 8:
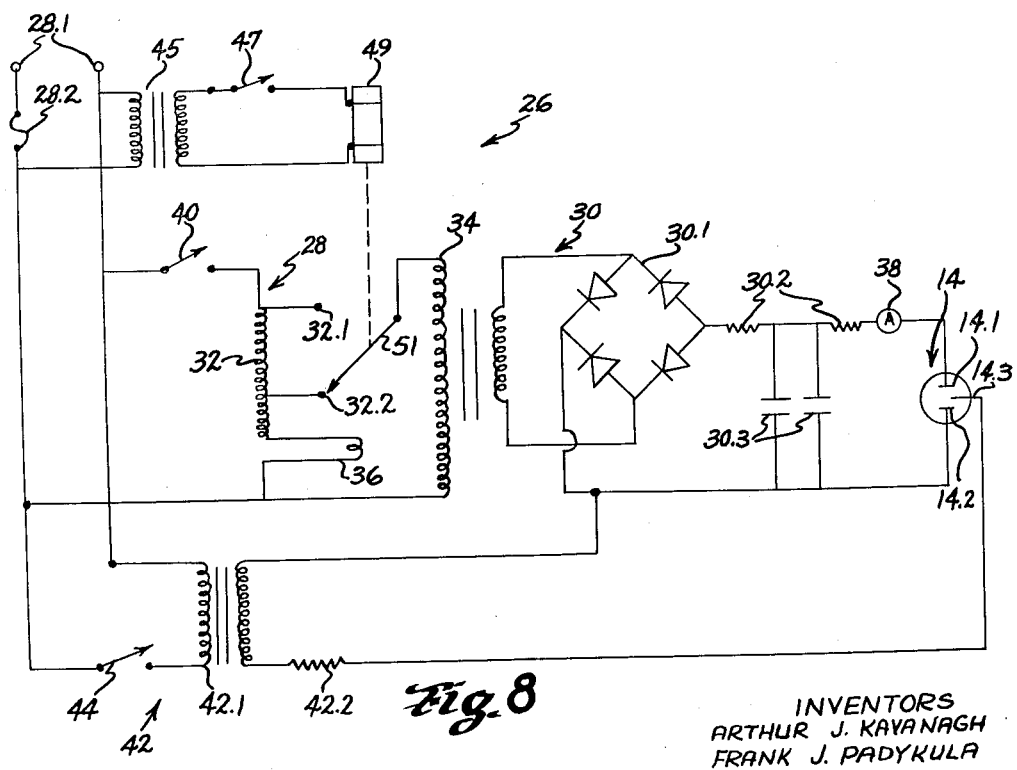

As is schematically illustrated in FIG. 8, the apparatus is provided with a power supply means 26 which can include a lamp power circuit 28 having an alternating current source, indicated by line terminals 28.1, protected by fuse means 28.2 for feeding a rectifier circuit 30 through a variable auto transformer 32 and a transformer 34, the rectifier circuit including rectifier means 30.1 and suitable current regulating components such as the resistors 30.2 and the capacitors 30.3. The power supply means is arranged to impress a relatively uniform D.C. voltage across the gap between the main arcing tips 14.1 and 14.2 of the lamp 14, thereby to establish an electric arc between the tips for creating light of sufficiently high intensity or intrinsic brightness to induce chorioretinal burns. If desired, an indicator lamp 36 or an ammeter 38, or both, can be interposed in series relation within the lamp power circuit or the rectifier circuit to provide visual means for determining current conditions in said circuits, and, of course, suitable switch means 40 can be provided for regulating apparatus actuation.

In a high-pressure mercury-vapor lamp of the type described, voltage increase in the lamp power circuit cannot be relied upon for arc-initiation, as is the case with conventional low-pressure vapor lamps, without risk of injury to the lamp, and, accordingly, the apparatus is provided with an arc-initiation circuit 42, including transformer means 42.1 actuable by switch means 44 and a current-limiting resistor 42.2, for imposing a high instantaneous A.C. voltage across the gap between the auxiliary arcing tip 14.3 and the main arcing tip 14.2 of the lamp, thereby to effect vapor ionization within the lamp to initiate the main D.C. arc of the lamp thereafter maintained between the arcing tips 14.1 and 14.2. However, transformer means 45 can be utilized in conjunction with switch means 47 for energizing a relay 49, when desired, to increase voltage in the lamp power circuit 28 for short intervals, thereby temporarily to increase intensity of the light emitted from the lamp for a purpose to be described below. To accomplish this, the relay 49 can be adapted to decrease voltage effected by the variable transformer 32 in conventional manner, energization of the relay moving switch means 51 between taps 32.1 and 32.2 of the variable transformer. Although an advantageous power supply means has been described for the purpose of illustration, it should be understood that various other power supply arrangements could be utilized for the apparatus herein described within the scope of this invention.

The optical system housing 16 mounted on the frame 12 includes an adapter 46 which is fitted within a frame aperture 12.1 and which is secured therein by lock nut means 46.1, the adapter having a flange portion 46.2 as shown in FIG. 2 engaged beneath a shoulder 48.1 on the mounting plate 48 for the shutter mechanism 18, thereby to hold the adapter and mounting plate in assembled relation. The shutter mounting plate 48 is secured to a second adapter 50 by screws 50.1, and the second adapter, in turn, is threadedly engaged with a tubular member 52. The adapter 46 has suitable lens spacers 46.4 for holding a four component lens set 46.3 in proper positional relation therein to direct and preferably to collimate a beam of light emanating from the lamp 14 through the lamp mount aperture 24.1, and the shutter mounting plate 48 has a light aperture 48.2 which, in cooperation wtih the tubular member 52, defines a path for the collimated beam as indicated by the arrow-headed lines 14a in FIG. 7. Preferably, lenses 54 mounted in partially split sleeves 54.1 of resilient material are fitted within the tubular member 52 for relaying the collimated beam of light in conventional manner, and, if desired, various light filtering means (not shown) can be fitted within the tubular member by similar means.

The shutter mechanism 18 has a mounting plate 48 apertured as at 48.2 to define a path for the collimated beam of light 14a as above described, and also has a recess 48.3 adapted to receive a shutter 56, the shutter being pivotally mounted as at 58 for movement between the closed shutter position shown in solid lines in FIG. 3 and the open shutter position indicated in broken lines in FIG. 3. The shutter 56 has a plurality of light apertures 56.1, preferably symmetrically spaced as shown, and has a plate or disc 60 of light diffusing material such as ground glass or plastic secured over the light apertures 56.1 by suitable means such as the screws 60.1. The shutter is normally biased by a spring means 62 mounted on the pivot pin 58 to remain in closed shutter position fitted over the mounting plate aperture 48.2 wherein the shutter intercepts or blocks all but a relatively small part of the light emanating from the source 14 in the collimated beam 14a, the shutter permitting passage of said small amount of light in separate pencils through the shutter apertures 56.1 so that the pencils of light are slightly diffused by the disc 60. However, a cable release 64, having an attaching portion 64.1 threadedly engaged within a bore 48.4 in the shutter mounting plate and having a flexible shaft portion 64.2 adapted to be pressed against the shutter 56, is provided for moving the shutter to open position, when desired, against the bias of the spring 62, thereby to permit the collimated beam of light 14a to be directed through the tubular member 52 without obstruction. Preferably an operating button 47.1 for the relay switch means 47 is spring mounted within the mounting plate recess 48.3 in a normally open position but is adapted, in conventional manner, to be depressed by the shutter 56 as it moves to open shutter position, whereby the switch means will be automatically operated for increasing intensity of the light beam 14a as above described during the period that the shutter is open. Of course, other types of shutter means such as those having several movable blades cooperable to open and close a light aperture and including means for automatic, timed shutter actuation can be provided within the scope of the invention for regulating the amount of collimated light which can be directed through the tubular member 52.

The reflector assembly 20 is adjustably mounted at one end of the optical system housing 16 as shown in FIGS. 1, 4, 5, and 7 to support means for reflecting the collimated beam of light 14a upon the eye 22 as shown in FIG. 7. The assembly includes a mounting block 66 having a bore 66.1 adapted to fit over an end of the tubular member 52 and has a boss portion 66.2 bored as at 66.3 to intersect the bore 66.1 and rotatably to receive the cam-shaped rod 66.4, the rod being rotatable by means of its knurled end 66.5 to grip or release the tubular member 52 for securing the block 66 thereto. The mounting block also has spaced extensions 66.6 supporting mirror mounting plates 68 and 70 which are held in spaced relation by a block 72 and which are attached by screws 74.

A semitransparent mirror 76 disposed in a frame 76.1 and a field lens support 78 having extending ears 78.1 and 78.2 are pivotally mounted on a common axis between the plates 68 and 70 by a pair of pivot pins 80 each pin having an end 80.1 rotatably engaged within the mirror frame, a portion 80.2 threaded at its end extending through an ear 78.1 or 78.2 of the field lens support and a mounting plate 68 or 70, and a shoulder 80.3 separating the mirror frame from the adjacent lens support ear. Each pin is threadedly engaged by a nut 82 for securing the pin in the described relation.

The field lens support has a field lens 84 secured therein by a retaining ring 84.1 or other suitable means for cooperation with indirect ophthalmoscope means (not shown) to view the fundus of the eye 22 through the semitransparent mirror 76. Preferably, the field lens support carries a light-shield 78.3, attached by screws 78.4 for protecting the eye of an observer, indicated at 79 in FIG. 1, using such opthalmoscope means from the light beam 14a.

In this construction, the mirror 76 is adapted to be pivoted on an axis transverse to the axis of the light beam 14a incident thereon by means of the pivot pins 80 and can also be rotated on an axis aligned with the incident light beam by releasing gripping of the tubular member 52 with the cam-shaped rod 66.4 and by rotating the mounting block around the tubular member. Thus the mirror can be adjustably positioned at any angle relative to the incident light beam for reflecting the light beam upon any portion of the fundus of the eye 22. As illustrated, the field lens support is arranged to move with the mirror so that, as the mirror reflects the light beam upon various portions of the fundus of the eye 22, the field lens 84 is automatically positioned for viewing said fundus portions. Thus, the field lens support and the mirror will be moved simultaneously about the axis of rotation aligned with the light beam 14a as the mounting block 66 is rotated relative to the tubular member 52. Similarly, links 86 and 88 pivotally connected at respective ends to the mounting plate 68, as at 86.1, and to the lens support ear 78.1, as at 88.1, are pivotally interconnected by a pin 76.2 which is slidably disposed in a slot or groove 76.3 in the mirror frame 76.1. In this construction, movement of the mirror about the axis of rotation transverse to the axis of the incident light beam 14a can be effected by movement of the field lens support about the pivots 80, the links 86 and 88 functioning as a toggle for effecting rotation of the mirror which is proportional to that of the field lens support.

According to the invention, the photo-coagulation apparatus is positioned in general relation to the eye of a subject as shown in FIG. 7, and, with the shutter 56 in the closed position, the switch 40 is moved to closed position from the position shown in FIG. 8, thereby permitting alternating current to flow in the lamp circuit 28. Then the switch 44 is closed for establishing an arc between the lamp arcing tips 14.3 and 14.2 to initiate an arc between the lamp arcing tips 14.1 and 14.2 as above described. In using the preferred types of high-pressure mercury-vapor or xenon arc lamp, power consumption by the lamp will not be excessive and heat generated by the lamp can be easily dissipated without requiring elaborate apparatus for this purpose. Light emanating from the arcing lamp 14 is then collimated to be directed upon the eye 22 but is substantially blocked by the shutter mechanism 18 so that only a relatively small part of the light passes the shutter 56 in separate pencils of light through the shutter apertures 56.1. This relatively small amount of light is reflected upon the fundus of the eye 22 by the reflector assembly 20 which can be adjusted as above described so that the light can be directed upon any part of the fundus, the small amount of light or radiant energy directed upon the fundus in this manner being insufficient to effect chorioretinal burns.

The light directed upon the fundus through the shutter 56 is slightly diffused by the plate or disc 60 so that a substantial area of the fundus is illuminated by the light, whereby, as the reflector assembly is adjusted for directing the light upon various parts of the fundus, the fundus area in which chorioretinal coagulation is to be induced can be conveniently selected. Further, the fundus of the eye, including peripheral areas thereof can be conveniently observed during such selection by the techniques of indirect opthalmoscopy, the field lens 84 cooperable with indirect opthalmoscope means being automatically positioned as above described for viewing the fundus area illuminated by the light.

In addition, the separate pencils of light passing through the shutter apertures 56.1 are representative of the collimated beam of light 14a so that focus or concentration of the light beam 14a upon the proper fundus area can be verified by means of the pencils of light prior to inducement of chorioretinal coagulation. Thus if the pencils of light are concentrated by the refractive media of the eye upon the fundus area to be coagulated so that a single circular area of slightly diffused light is centered on said area, proper focusing of the light beam 14a will be assured; however, if the pencils of light illuminate spaced areas of the fundus, the positional relation of the lamp 14 and the lens set 46.3 can be adjusted by means of the nuts 24.3 until the areas illuminated by the pencils of light are superimposed at the proper location.

After the fundus of the eye 22 has been observed and a fundus area to be coagulated has been selected, and after focus or concentration of the light beam 14a upon the selected fundus area has been accomplished, the cable release 64 can be depressed for moving the shutter to open position to permit the full energy of the light beam 14a to fall upon the selected fundus area for effecting chorioretinal coagulation. As above described, movement of the shutter 56 to open position actuates switch means 47 so that as the shutter is opened, the lamp current is increased, even to overload the lamp, for increasing intensity of the light beam emanating therefrom. Development of the chorioretinal coagulation can be carefully and conveniently observed by indirect opthalmoscopy, and when the coagulation has progressed to the desired extent, the cable release can be freed so that the spring means 62 returns the shutter to closed position, opening the switch means 47. Since coagulation times are necessarily very short, overloading of the lamp 14 for temporarily increasing light intensity can be accomplished without serious risk of injury to the lamp.

Although a particular embodiment of this invention has been described for the purpose of illustration, it should be understood that this invention includes all modifications and equivalents which fall within the scope of the appended claims.

We claim:

Photocoagulation apparatus comprising a light source; optical means which are adjustable for directing a beam of light from said source along a path onto an eye to be focused upon a selected relatively small fundus portion by the refractive media of the eye for effecting photocoagulation of said fundus portion; shutter means mounted for movement into the path of said light beam for temporarily shielding the eye from said light, said shutter means having a plurality of apertures therein permitting a limited part of said light to pass in separate pencils through respective apertures of said shutter means onto the eye; and diffusing means mounted for movement with said shutter means for diffusing said separate pencils of light to a uniform limited extent so that said respective pencils of light can be projected upon concentric, relatively large fundus portions by the refractive media of the eye; whereby said limited part of said light can permit observation of the fundus during selection of the fundus portion to be coagulated and can permit verification of the focus of said light beam upon said selected fundus portion and said shutter means can be thereafter moved out of the path of said light beam for permitting photocoagulation of said selected fundus portion.

References Cited in the file of this patent

UNITED STATES PATENTS

| | | |
|---|---|---|
| 1,741,526 | Kuhl | Dec. 31, 1929 |
| 2,930,379 | Dopp et al. | Mar. 29, 1960 |
| 2,947,216 | Drews | Aug. 2, 1960 |